United States Patent
Gomyo et al.

(10) Patent No.: US 6,837,622 B2
(45) Date of Patent: Jan. 4, 2005

(54) DYNAMIC PRESSURE BEARING APPARATUS

(75) Inventors: Masato Gomyo, Nagano (JP); Shingo Suginobu, Nagano (JP); Kazushi Miura, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 30 days.

(21) Appl. No.: 10/439,964

(22) Filed: May 15, 2003

(65) Prior Publication Data

US 2004/0008912 A1 Jan. 15, 2004

(30) Foreign Application Priority Data

May 15, 2002 (JP) ........................................ 2002-139585

(51) Int. Cl.[7] ............................................. F16C 17/02
(52) U.S. Cl. ....................................... 384/100; 384/114
(58) Field of Search ................................. 384/100, 107, 384/113, 114, 123

(56) References Cited

U.S. PATENT DOCUMENTS 5,760,509 A * 6/1998 Chung ........................ 384/108

FOREIGN PATENT DOCUMENTS

JP 2001-289243 10/2001

* cited by examiner

*Primary Examiner*—Lenard A. Footland
(74) *Attorney, Agent, or Firm*—Reed Smith LLP

(57) ABSTRACT

A dynamic pressure bearing apparatus provides a configuration in which the label on which desired data is visibly printed is arranged in a manner that the label does not overlap with a cover plate at least in the area where the label faces the rotary shaft in the shaft direction where the cover plate covers the opening of the bearing sleeve. Deformation of the cover plate that may occur during attachment of the label onto the cover plate is thus prevented. The position of the cover plate is leveled with the position of the label, which makes height reduction of the bearing apparatus possible. Subsequently, even when a relatively thick label is attached onto the frame, the dynamic pressure bearing apparatus can still be made thinner without adversely affecting performance or life thereof.

11 Claims, 7 Drawing Sheets

DYNAMIC PRESSURE BEARING APPARATUS

TECHNICAL FILED OF THE INVENTION

The present invention relates to a dynamic pressure bearing apparatus having a cover plate attached to the opening of a bearing sleeve that supports the rotary shaft via a lubrication fluid.

BACKGROUND OF THE INVENTION

Lately, among all types of rotary driving apparatus, the development of a dynamic pressure bearing apparatus that is essentially a rotor that rotates accurately at a high speed has advanced wherein a lubrication fluid generates a dynamic pressure to support a rotary shaft in the dynamic pressure bearing apparatus. For example, in the dynamic pressure bearing motor that is used for a hard disk drive illustrated in FIG. 5, rotary shaft 3 is rotatably inserted into bearing sleeve 2 having a hollow cylindrical shape and is attached to frame 1. A lubrication fluid is injected into a narrow gap between the dynamic pressure bearing sleeve 2 (hereinafter referred to as the "bearing sleeve") and rotary shaft 3. A dynamic pressure bearing is thus constructed. The lubrication fluid generates a dynamic pressure to support rotary shaft 3 in a non-contacting manner. Rotary hub 4 is coupled in a manner that rotary hub 4 integrally rotates with rotary shaft 3.

Thin flat cover plate 5 is attached to the bottom end of the dynamic pressure bearing apparatus, which is opposite the surface end at which rotary hub 4 is joined together, as illustrated in FIG. 6, in such a manner that cover plate 5 closes the opening of bearing sleeve 2. The inner surface (upper end surface in the figure) of cover plate 5 in the inner portion toward the bearing is longitudinally arranged very close to shaft edge 3a of rotary shaft 3, which is the edge at the lower end of the figure. In the example illustrated in FIG. 6, a lubrication fluid is filled in the space partitioned by cover plate 5 in the inner portion toward the bearing such that it is continuous with the dynamic pressure bearing.

Herein, the edge toward the bottom end of frame 1 extends roughly parallel to the surface of cover plate 5 toward the outer end of the bearing and the product data label (product data plate) 6 (hereinafter referred to as "label") on which desired data is visibly printed is adhesively attached to the edge of frame 1 toward the bottom end. Label 6 is printed with data such as date of manufacturing, lot number, and the manufacturer's name. Label 6 is attached to a place on frame A where the product data on label 6 is visible even when the dynamic pressure bearing motor M is attached onto the frame A in a hard disk drive apparatus, as illustrated in FIG. 7. More specifically, label 6 is attached to the area around cover plate 5 in such a manner that a circuit board or other components do not interrupt label 6. Label 6 of a conventional apparatus is adhesively attached to the bottom-end edge of frame 1 such that label 6 covers the entire outer surface of cover plate 5.

On the other hand, along with the recent trend of ever decreasing height of a rotary drive apparatus represented by a motor, the development of a thin dynamic pressure bearing apparatus, in which the longitudinal height of the bearing apparatus is reduced, has quickly advanced especially in the manufacturing of a hard disk drive apparatus. The preference for a thin dynamic pressure bearing apparatus induced the preference for a thin flat member for cover plate 5 and an extremely narrow gap between cover plate 5 and the longitudinal edge of rotary shaft 3. However, a thick label can be attached onto the cover plate much more efficiently than a thin label. As a result, insofar as a label is concerned, the situation is that the thicker the label, the better. This has provided an adverse effect on an attempt to reduce the longitudinal height of a dynamic pressure bearing apparatus.

In addition, where label 6 is adhesively attached in such a manner that it covers cover plate 5 as described above, one may unintentionally push cover plate 5 during attachment to deform cover plate 5. Once cover plate 5 deforms when a lubrication fluid is filled up to the inner end of cover plate 5, the lubrication fluid in the dynamic pressure bearing is pushed up in the shaft direction by the amount the cover plate 5 is deformed. This creates the possibility that the lubrication fluid may leak out from the open gap which is on the opposite end of bearing sleeve 2, subsequently deteriorating the bearing properties or lifetime of the dynamic pressure bearing.

Moreover, as is the case in the apparatus disclosed in Japanese patent application Laid-open (Kokai) No. 2001-289243, in an apparatus having a structure in which a lubrication fluid is filled in a space partitioned by the inner portion of the cover plate toward the bearing, the deformed portion of the cover plate may contact members toward the rotary shaft, causing abrasion or damage thereof. The contact by the deformed cover plate contaminates contacted members, further contaminating the lubrication fluid in the dynamic pressure bearing.

The apparatus in which a rigid plate constituting a thrust bearing is arranged to face the cover plate in the shaft direction is less likely to have the above problem. Nonetheless, the longitudinal height of the dynamic pressure bearing apparatus increases by the amount that the rigid plate occupies, which is an undesirable effect on the demand for a thin bearing.

Therefore, it is desirable to provide a very thin dynamic pressure bearing having excellent properties and lifetime even though a relatively thick label is attached thereto.

SUMMARY OF THE INVENTION

To overcome the stated problem, in one aspect of the dynamic pressure bearing apparatus, the area of attachment of the label is limited to the outer end from the area on the cover plate facing the rotary shaft of a frame in a radial direction. The label is visibly printed with the desired information and attached to at least an edge of the frame. As a result, the label does not overlap with the cover plate in the shaft direction at least in the area where the label faces the rotary shaft.

According to the dynamic pressure bearing apparatus having the above configuration, a label does not overlap with a cover plate at least in the area where the cover plate faces the label. This eliminates the possibility of causing deformation of the cover plate when one attaches the label on the cover plate. Leaking of lubrication fluid due to deformation of the cover plate or the cover plate's contacting members at the rotary shaft end can thus be avoided.

Further, leveling the cover plate with the label in the shaft direction increases the longitudinal length of the bearing sleeve thus enhancing properties of the bearing. Alternately, leveling the cover plate and the label reduces the height of the dynamic pressure bearing apparatus, thereby providing a thin apparatus.

In another aspect of the dynamic pressure bearing apparatus, the label is made of a ring-like member that is formed in such a manner that the inner circumference is circular wherein an alignment guiding portion is provided along the hollow area, which is the inner end of the label's inner circumference, thereby enhancing accuracy of label placement along the aligning guide portion with ease of handling the label.

In another aspect of the dynamic pressure bearing apparatus, the wall of the inner circumference of the bearing sleeve provides a dynamic pressure radial bearing (hereinafter referred to as "radial bearing (RB)") and at least one longitudinal edge of the bearing sleeve provides a dynamic pressure thrust bearing (hereinafter referred to as the "thrust bearing (SB)"). This is particularly suited to a dynamic pressure bearing apparatus having a thin thrust bearing structure.

In another aspect of the dynamic pressure bearing apparatus, a space that is partitioned in the inner-end portion of the cover plate toward the bearing to be filled with a lubrication fluid such that the space is continuous with the dynamic pressure bearing via the lubrication fluid. In still another aspect of the dynamic pressure bearing apparatus, a space that is partitioned in the inner portion of the cover plate toward the bearing such that the space communicates with another space that is filled with the lubrication fluid in the dynamic pressure bearing.

Consequently, the present invention is effective for a thin dynamic pressure bearing as it eliminates a rigid plate used for constituting a thrust bearing, and more specifically, configures a thrust bearing utilizing an edge of a bearing sleeve.

DETAILED DESCRIPTION OF THE INVENTION

Embodiments of the present invention are described in detail herein. First, an example of applying the dynamic pressure bearing apparatus of the present invention to a hard disk drive is described.

Figure 1:
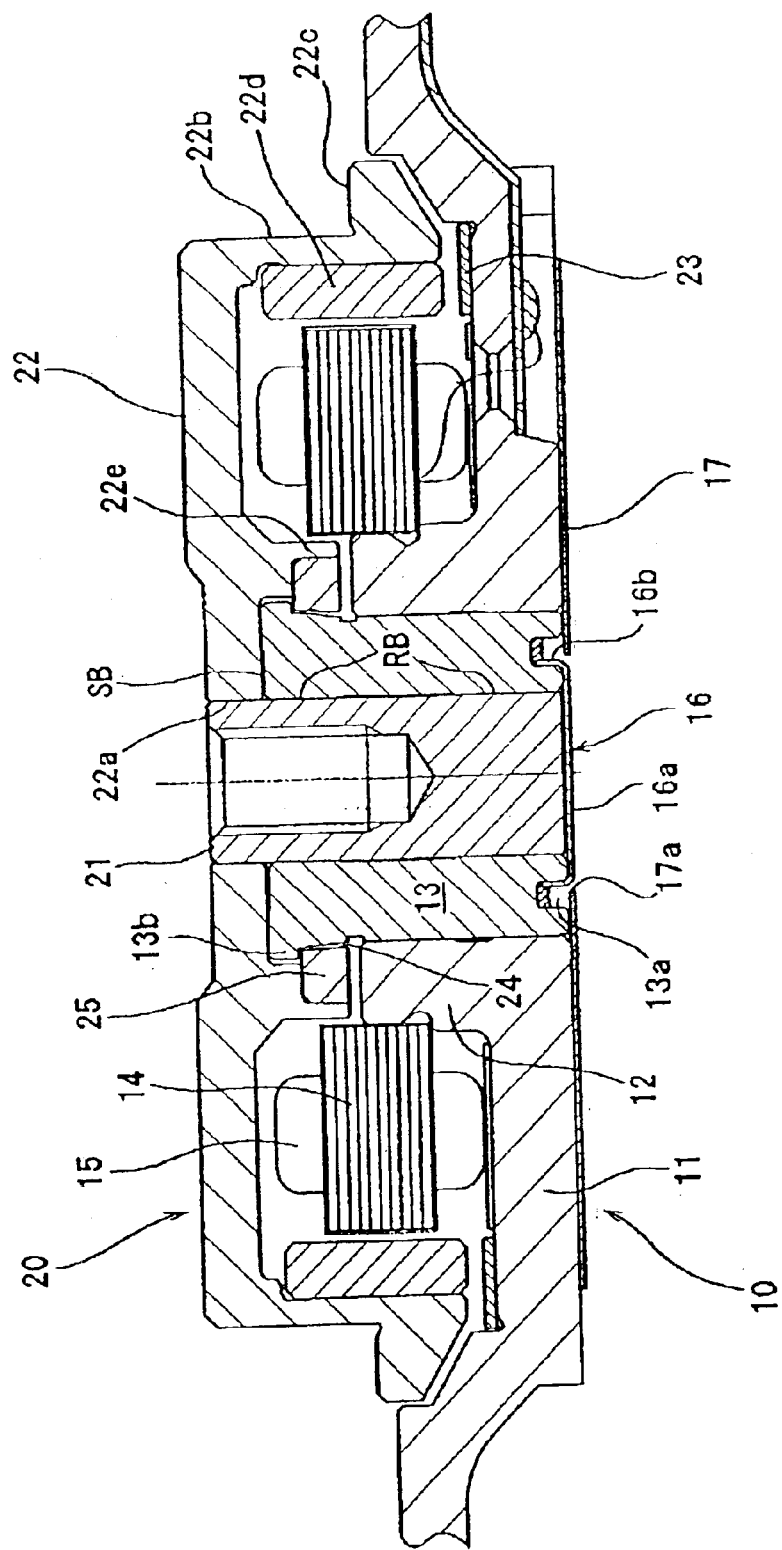
FIG. 1 is a cross sectional schematic diagram illustrating the spindle motor of a shaft rotation type for a hard disk drive that is equipped with the dynamic pressure bearing apparatus according to one embodiment of the present invention.
Figure 2:
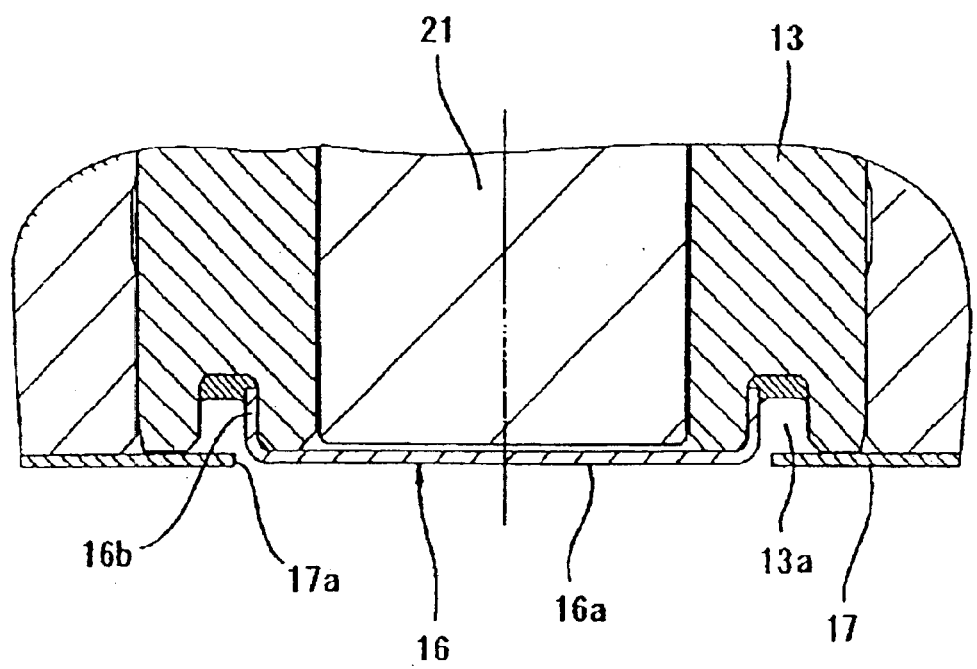
FIG. 2 is an enlarged cross sectional diagram of the cover plate mount portion for a spindle motor for the hard disk drive illustrated in FIG. 1.

FIG. 1 is an overall view of the rotary shaft type hard disk drive apparatus, which comprises: a stator assembly 10; rotor assembly 20 which is built onto stator assembly 10 from the upper level in the figure. Stator assembly 10 has a securing frame 11, which is screwed onto a fixed base (not illustrated). Securing frame 11 is made of an aluminum type metallic material to help minimize its weight. Bearing sleeve 13, a secured bearing member shaped in a hollow cylinder, is inserted into the inner circumference wall of annular bearing holder 12 to stand on the center of securing frame 11 and is connected to bearing holder 12 by press fitting or shrink fitting. Bearing sleeve 13 is made of copper material such as a Cu—Zn—P alloy to improve machinability, thereby easing drilling of a small hole or similar machining thereof.

The wall on the inner circumference end of stator core 14 is inserted into the mounting surface on the outer circumference of bearing holder 12 wherein stator core 14 is made of laminated electromagnetic steel plate. Driving coil 15 is radially wrapped around each projecting pole around stator core 14.

Rotary shaft 21 of a rotor assembly 20 is rotatably inserted in the center hole provided on bearing sleeve 13. In other words, the wall of the inner circumference of bearing sleeve 13 provides a dynamic pressure surface and the radial wall of outer circumference of rotary shaft 21 provides another dynamic pressure surface such that both dynamic pressure surfaces face each other in a radial direction, putting a minute gap (distance) therebetween. Two dynamic pressure radial bearings (RB, RB) are provided at a given distance defined by the minute gap. More specifically, the dynamic pressure surface on bearing sleeve 13 and the dynamic pressure surface on rotary shaft 21, in the dynamic pressure radial bearing (RB), circularly face each other via the gap as small as several micrometers ($\mu$m). A lubrication fluid (not illustrated) such as lubrication oil or magnetic fluid and the like is injected or interposed in the shaft direction without interruption.

Further, on the dynamic pressure surface of either bearing sleeve 13 or rotary shaft 21 or on both dynamic pressure surfaces, two pieces of dynamic pressure generation grooves (not illustrated) represented by a herringbone or similar shape are annularly and spirally threaded in an axial direction. The pumping motion during rotation of the dynamic pressure generation groove pressurizes a lubrication fluid (not illustrated) and the dynamic pressure of the lubrication fluid supports rotary hub 22 described later around the shaft without contacting bearing sleeve 13.

Rotary hub 22, which constitutes rotor assembly 20 together with rotary shaft 21 is made of an aluminum type metal having a cup shape in cross section and is linked with the upper portion of rotary shaft 21 in FIG. 1. The upper portion of rotary shaft 21 stands out above bearing sleeve 13 and is press fitted or shrink fitted to rotary hub 22 such that rotary hub 22 rotates integrally with rotary shaft 21 via linking hole 22a. Rotary hub 22 is constructed with a cylindrical body 22b and a disk mount 22c wherein body 2b receives a data storage disk such as a magnetic disk (not illustrated) along its outer circumference wherein disk mount 22c extends outward in a radial direction at body 22b to secure the data storage disk in the shaft direction. A damper (not illustrated) is screwed into the upper end in the figure such that the damper covers the data storage disk to apply downward force from the upper level. The data storage disk is thus secured.

An annular driving magnet 22d is attached to the inner circumference wall of body 22b of rotary hub 22. The inner circumference wall of annular driving magnet 22d is arranged in the vicinity of stator core 14 in a manner that annular driving magnet 22d radially faces the outer circumference of each salient pole. Viewed in the shaft direction, the bottom surface of annular driving magnet 22d faces magnetic attraction plate 23 attached to securing frame 11 such that both members 22d and 23 magnetically attract each other. The entire rotary hub 22 is thus attracted to magnetic attraction plate 23 in the shaft direction, providing a stable rotation.

On the other hand, at the bottom end (the bottom in FIG. 1) opposite rotary hub 22, cover plate 16 having a dish shape closes an opening at the bottom end of bearing sleeve 13. Flange-like mount 16b stands on the outer circumference of disk-like body 16a on cover plate 16. Flange-like mount 16b is press fitted to the wall of inner circumference of concave lock portion 13a surrounding the opening at the bottom of bearing sleeve 13 such that the flange-like mount 16b presses against the wall of the inner circumference of concave lock portion 13a, securing contact therebetween. The inner surface of the inward portion of the bearing (upper portion in the figure) of body 16a on cover plate 16 closely faces the edge of the bottom of rotary shaft 21 at the lower end in the figure. The space which surfaces of cover plate 16 and the surface of rotary shaft 21 partition is filled with a lubrication fluid such that the fluids in this space are continuous with the fluid held in each aforementioned radial bearing (RB).

The edge of bearing sleeve 13 at the upper end of the figure and the inner surface in the center of the aforementioned rotary hub 22 at the lower end of the figure closely face each other in the shaft direction. Thrust bearing (SB) is provided in the area defined by the upper end surface of bearing sleeve 13 in the figure and the lower end surface of rotary hub 22 in the figure wherein both surfaces are facing each other in the shaft direction. In other words, either dynamic pressure surface 13 or dynamic pressure surface 22 or both face each other to constitute the aforementioned thrust bearing (SB) having a dynamic pressure thrust generation groove (not illustrated) of a herringbone shape, for example. The longitudinally facing portions having the dynamic pressure thrust generation grove provide the thrust bearings (SB).

The dynamic pressure surface on top of bearing sleeve 13 in the figure and the dynamic pressure surface on the bottom of rotary hub 22 in the figure closely face each other in the shaft direction, putting a minute gap of several $\mu$m therebetween. A lubrication fluid such as oil, magnetic fluid, or a lubrication fluid of another kind, is also filled such that the fluid filled in the space defined by the minute gap is continuous with the fluid held in the radial bearing (RB). As the bearing assembly is rotated, pumping occurs in the dynamic pressure thrust generation groove to pressurize the lubrication fluid to generate dynamic pressure thereof. The dynamic pressure thus floatingly supports rotary shaft 21 and rotary hub 22 in the thrust direction without contacting each other.

On the wall of outer circumference of bearing sleeve 13, a fluid seal portion constructed with capillary seal portion 24 is partitioned. That is, capillary seal portion 24, which is a fluid seal portion, is provided in such a way that capillary seal portion 24 is coupled with thrust bearing (SB) at the outer end in the radial direction. The capillary seal portion 24 is partitioned by the wall of the outer circumference of bearing sleeve 13 and the wall of the inner circumference of annular member 25, which is a stopper facing the wall of outer circumference of bearing sleeve 13 in a radial direction.

Annular member 25 is made of a member shaped as a ring from a top view, and the outer circumferential portion of annular member 25 is contactingly fixed onto the wall of inner circumference of flange-like fixing portion 22e provided on rotary hub 22.

Fixing portion 22e is the inner surface of rotary hub 22 at the lower end in the figure, and extends out in the shaft direction (downward in the figure) in the outward area of thrust bearing (SB) in a radial direction. Annular member 25 is inserted into fixing portion 22e in a manner that annular member 25 contacts the wall of the inner circumference of fixing portion 22e. Applying some adhesive to the inserted portion further enhances bonding between the annular member 25 and fixing portion 22e.

The wall of the inner circumference of annular member 25 is placed closed to the wall of outer circumference of bearing sleeve 13 such that the two walls partition a radial gap that is continuous with the thrust bearing (SB). The radial gap in the radial direction thus forms fluid seal portion 24 that prevents a lubricant fluid from leaking out of thrust bearing (SB).

The gap providing capillary seal portion 24 between the wall of inner circumference of annular member 25 and the wall of outer circumference of bearing sleeve 13 are provided in a manner that the gap continuously enlarges toward the open end (lower end of the figure), providing a tapered sealing space. The lubrication fluid filled in the thrust bearing (SB) continues all the way to capillary seal portion 24 such that the surface of the lubrication fluid is positioned in the middle of capillary seal portion 24 all the time. At this stage, the wall of the outer circumference of bearing sleeve 13 and the wall of the inner circumference of body 25b of annular member 25 together define capillary seal portion 24. Walls of both members have a tapered surface inclining toward an inward radial direction. The center shaft of capillary seal portion 24 inclines inward in a radial direction toward the open end (lower end in the figure). The centrifugal force generated thus pushes the lubricant fluid inward (upper level in the figure) in capillary seal portion 24 while the inherent capillary force prevents the lubricant fluid to leak therefrom.

On the other hand, collar 13b that prevents the rotary hub 22 from falling off (hereinafter referred to as "collar 13b") is provided on top of bearing sleeve 13 in such a manner that collar 13b projects outward in the radial direction and a part of collar 13b faces the top of annular member 25 in the shaft direction in the figure. Collar member 13b and annular member 25 are further arranged to contact each other, further preventing rotary hub 22 from falling off in the shaft direction.

The bottom surface of fixing securing frame 11 is extended in parallel with the surface of cover plate 16 pointing outside the bearing (the lower end in the figure) at the bottom end of sleeve 13 where cover plate 16 is provided. Label 17 to be sealed onto cover plate 16 is adhesively attached on top of securing frame 11 having label 17 printed with product data such as date of manufacturing, lot number, and the manufacturer's name. Label 17 has an inner circumference 17a made of a ring-like member having a shape of a circle and attached on top of securing frame 11 in the outer circumference area of cover plate 16. In other words, label 17 is arranged such that it does not overlap with cover plate 16 in the shaft direction. As a result, cover plate 16 is exposed to the outer end of the bearing (lower end in the figure) through the hollow area inside inner circumference 17a, which is the hollow area provided in the center of label 17.

In this configuration, the surface of cover plate 16 at the outer end of the bearing (lower end in the figure) in the shaft direction is extended downward to the point that is level with the surface of label 17 such that the outer surfaces of cover plate 16 and the outer surface of label 17 stay on the same plane.

As described already, cover plate 16 is exposed through the hollow area provided inside inner circumference 17a of label 17 such that cover plate 16 is visible from the outer side of the bearing. As a result, when label 17 is attached onto the outer circumference of cover plate 16, one can utilize the outer circumference of cover plate 16 or the wall of inner circumference of concave fixing portion 13a of bearing sleeve 13, which originally fixes cover plate 16 onto securing frame 11, as a guide for alignment during attachment.

According to the dynamic pressure bearing apparatus of the present invention having the configuration described above, label 17 is attached onto the end surface of securing frame 11 in a manner that label 17 does not overlap cover plate 16 in the shaft direction, as a result, cover plate 16 does not deform while one attaches label 17 onto cover plate 16. Leaking of lubrication fluid or contact with members at the rotary shaft end due to deformation of cover plate 16 is thus prevented.

The dynamic pressure bearing apparatus of this embodiment takes advantage of utilizing one end of bearing sleeve 13 in the shaft direction to form dynamic pressure thrust bearing (SB), thus providing a thin type dynamic pressure thrust bearing (SB). This thin type bearing apparatus does not require the use of a rigid plate that is normally required to construct thrust bearing (SB). In other words, the cover plate 16 of this embodiment is made of a thin flat member replacing the rigid plate to construct the thrust bearing. The present invention is particularly advantageous when it is applied to a bearing apparatus, which uses cover plate 16 made of a thin flat member that is susceptible to deformation.

Figure 6:
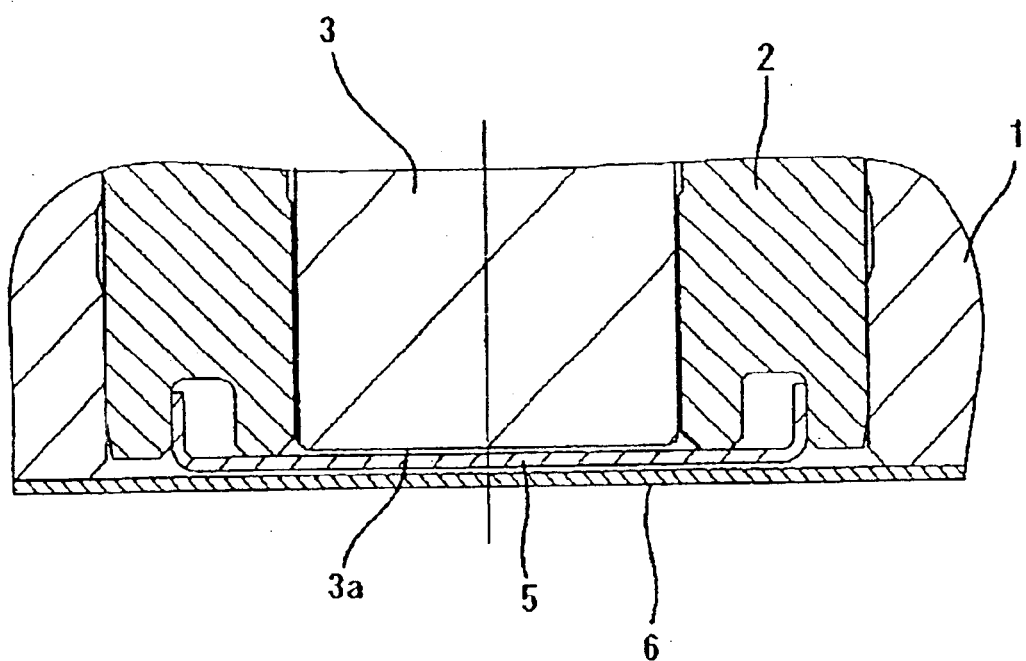
FIG. 6 is a cross sectional diagram illustrating the portion to which a cover plate of conventional technology is attached wherein the cover plate is used for a spindle motor for the hard disk drive of FIG. 5.
Figure 7:
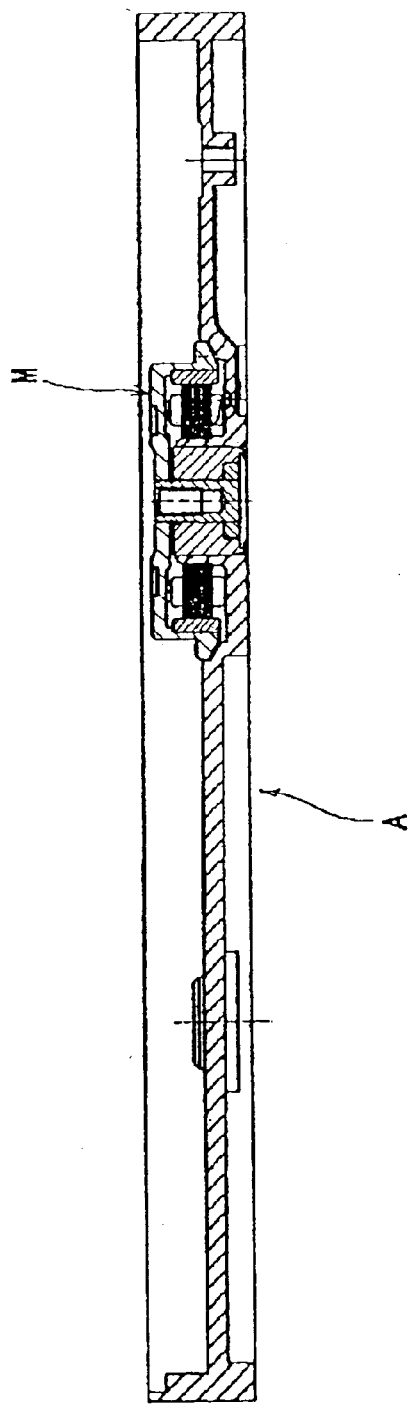
FIG. 7 is a cross sectional diagram illustrating the manner in which the spindle motor of FIG. 5 is attached to a hard disk drive.

Unlike conventional technology in which the surface of cover plate 16 at the point where outer surface of label 17 is retracted upward (see FIG. 6), label 17 does not overlap with cover plate 16, as a result, the outer surfaces of cover plate 16 and the outer surface of label 17 stay on the same plane. Subsequently, the present invention provides an advantageous dynamic pressure bearing in terms of performance by making an extension of the length of bearing sleeves 13 possible, or in terms of thinning the overall dynamic pressure apparatus by reducing the height of the bearing.

Now, in the above embodiment, the outer circumference of cover plate 16 or locking concavity 13a of bearing sleeve 13 is provided in the hollow area inside inner circumference 17a of label 17 made of a ring-like member as an alignment guiding portion which helps aligning label 17 during attachment. These alignment-guiding portions help attachment of label 17 onto the frame 11 to be accurate and easy.

Figure 3:
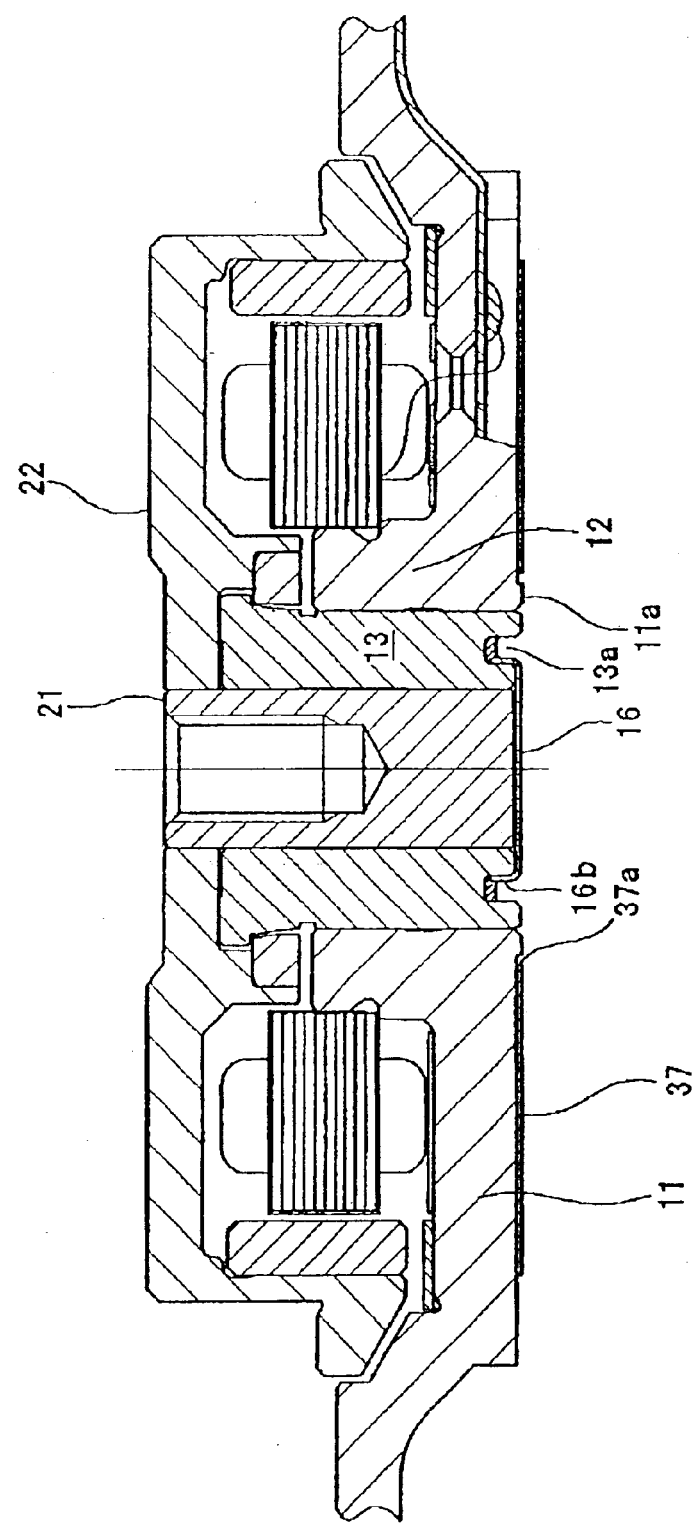
FIG. 3 is a cross sectional schematic diagram illustrating the spindle motor of a shaft rotation type for a hard disk drive that is equipped with a dynamic pressure bearing apparatus of another embodiment of the present invention.

In the embodiment illustrated in FIG. 3, the same reference symbols are given to the same components used in the embodiment illustrated in FIG. 1. In the embodiment of FIG. 3, the center hole defined by inner circumference 37a of label 37 is provided in a manner that the diameter of this center hole is somewhat larger than the above embodiment. Herein, inner circumference 37a of label 37 that partitions such a large center hole extends to the edge of securing frame 11. Alignment guiding portion 11a, which is the inner circumference of bearing holder 12, annularly projects in the shaft direction in the vicinity of inner circumference 37a of label 37. These alignment guiding portions help attachment of label 37 onto the frame 11 to be accurate and easy. Note that alignment guiding portion 11a is there to be taken advantage of during attachment, which does not mean that inner circumference 37a of label 37 must touch alignment guiding portion 11a.

Figure 4:
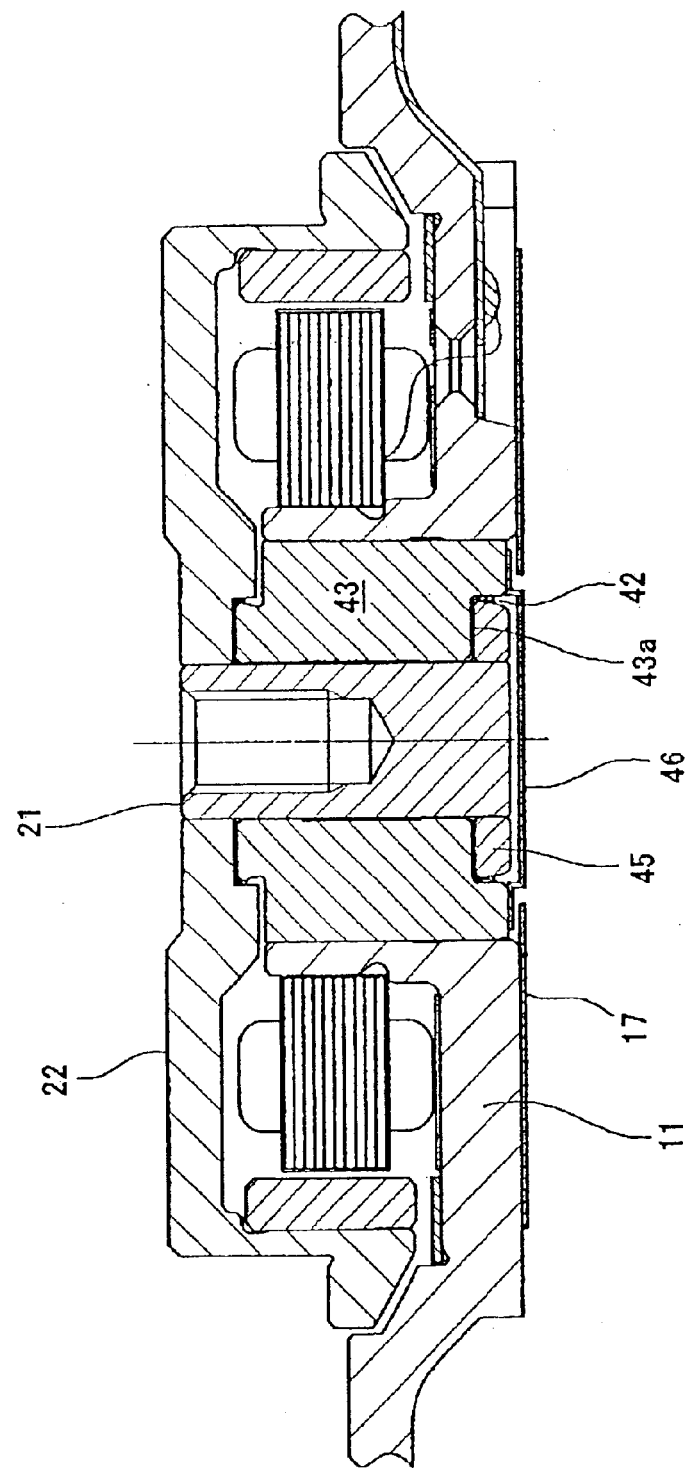
FIG. 4 is a cross sectional schematic diagram illustrating the spindle motor of a shaft rotation type for a hard disk drive that is equipped with a dynamic pressure bearing apparatus of another embodiment of the present invention.
Figure 5:
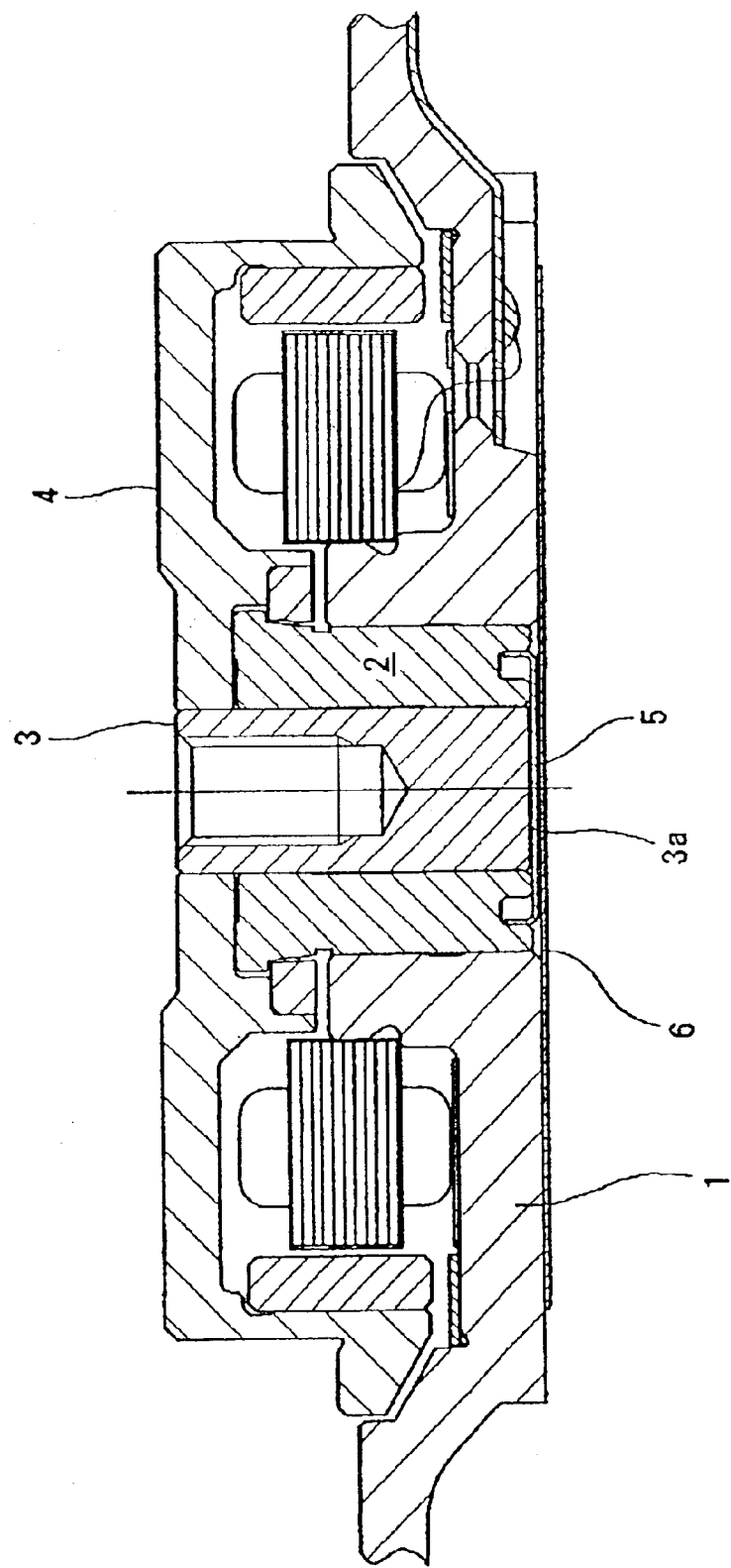
FIG. 5 is a cross sectional schematic diagram illustrating the spindle motor of a shaft rotation type for a hard disk drive that is equipped with a dynamic pressure bearing apparatus of conventional technology.

In the embodiment illustrated in FIG. 4, the same reference symbols are also given to the same components used in the embodiment illustrated in FIG. 1 or FIG. 3. In the embodiment of FIG. 4, ring-like stopper member 45 is connected to the lower end portion of rotary shaft 21 in the figure by means of press fitting or shrink fitting. The ring-like stopper member 45 is housed in concavity 43a provided in the inner circumference end of the opening at the lower end of bearing sleeve 43 in the figure. Capillary seal portion 42 is provided on the wall of outer circumference of stopper member 45. In other words, the lubrication fluid in the radial bearing (RB) is filled continuously up to the middle of capillary seal portion 42, thereby creating a liquid surface within capillary seal portion 42.

A space that communicates with another space filled with the lubrication liquid in the radial bearing (RB) is partitioned by the inner surface of the inner end (upper end in the figure) of cover plate 46 in a bearing, that is attached in a manner that cover plate 46 covers stopper member 45 at the outer end (lower end in the figure).

In this case also, the area where label 17 faces at least the edge of rotary shaft 21 does not overlap with cover plate 46 in the shaft direction and label 17 is attached to the edge of securing frame 11, which is a radial area outside the region facing rotary shaft 21. As a result, label 17 can be pressed against the edge of securing frame 11 during attachment without any problem.

As described, the present invention has embodiments illustrated in FIG. 1 and FIG. 3 where a space provided in the inner portion of cover plate 16 is filled with a lubrication fluid. The present invention is also illustrated by the embodiment of FIG. 4 where a space provided in the inner portion of cover plate 46 is not filled with a lubrication fluid. Excellent results are obtained in any of the cases.

As described above, the dynamic pressure bearing apparatus according to a first aspect provides a configuration in which the label on which desired data is visibly printed is arranged in a manner that the label does not overlap with a cover plate at least in the area while the label faces the rotary shaft in the shaft direction where the cover plate covers the opening of the bearing sleeve. Deformation of the cover plate that may occur during attachment of the label onto the cover plate is thus prevented. The position of the cover plate is leveled with the position of the label, which makes height reduction of the bearing apparatus possible. Subsequently, even when a relatively thick label is attached onto the frame, the dynamic pressure bearing apparatus can still be made thinner without adversely affecting performance or life thereof.

The dynamic pressure bearing apparatus according to a second aspect provides a configuration in which a label is made of a ring-like member having a circular shape and an alignment guiding portion is further provided in the center hollow area inside the inner circumference of the ring-like member to help ease alignment of the label while it is being attached. The use of the alignment guiding portion thus helps provide accurate and easy attachment of the label, consequently improving productivity.

The dynamic pressure bearing apparatus according to a third aspect provides a configuration in which the wall of the inner circumference of the bearing sleeve of the first aspect provides a radial bearing and at least one edge of the bearing sleeve provides a thrust bearing of the first aspect. The thin-type thrust bearing structure providing excellent performance can thus be obtained. Among all these advantageous effects the present invention provides, it should be noted that the present invention is particularly suited to a thin-type dynamic pressure bearing apparatus.

The dynamic pressure bearing apparatus according to a fourth aspect provides a configuration in which a space filled with a lubrication fluid is partitioned at the inner portion of a cover plate for the apparatus according to the first aspect toward the bearing end in a manner that the space is a continuation of the dynamic pressure bearing. Also, the dynamic pressure bearing according to a fifth aspect provides a configuration in which one space communicates with another space filled with a lubrication fluid for the dynamic pressure bearing at the inner portion of a cover plate for the apparatus according to the first aspect toward the bearing end. The present invention enhances all of the above advantageous effects.

Even though the present invention has been described with reference to the above embodiments, the present invention is not limited to these embodiments. The present invention can be modified in a variety of ways as long as the spirit of the present invention remains the same.

For example, in the above embodiments, the present invention was applied to a dynamic pressure bearing apparatus for use in a spindle motor in a hard disk drive. Nonetheless, the present invention can be applied to many more types of dynamic pressure bearing apparatus in a similar manner.

What is claimed is:

1. A dynamic pressure bearing apparatus comprising:
   a shaft rotatably inserted into a bearing sleeve attached to a frame, said rotary shaft being supported by a dynamic pressure generated by a lubrication fluid injected into said bearing sleeve without contacting said rotary shaft;
   a rotor which is joined with a projecting portion of said rotary shaft so as to rotate integrally with said rotary shaft;
   a cover plate made of a thin flat member for closing an opening of said bearing sleeve having two edges along said rotary shaft between both longitudinal edges of said rotary shaft, said opening being provided at an edge opposite to the other edge to which said rotor is connected;
   a product data label having desired information visibly printed thereon, said product data label adhesively attached to an edge of said frame, said frame having a plane about parallel to said bearing's outer surface plane on said cover plate;
   wherein the area of said frame edge on which said label is attached is arranged at the outer end of the area on said cover plate facing the rotary shaft in the radial direction such that said label does not overlap with said cover plate in the shaft direction at least in said area of said cover plate facing said rotary shaft.

2. The dynamic pressure bearing apparatus as set forth in claim 1 characterized by said label being made of a ring-like member having an inner circumference shaped as a circle wherein an alignment guiding portion is provided to assist in adhesively attaching said label in a hollow area inside the inner circumference of said label.

3. The dynamic pressure bearing apparatus as set forth in claim 1 characterized by the wall of the inner circumference of said bearing sleeve providing a radial bearing and at least one longitudinal edge of said bearing sleeve providing a thrust bearing.

4. The dynamic pressure bearing apparatus as set forth in claim 1 characterized by a space being partitioned in the inner-end portion of said cover plate toward the bearing to be filled with a lubrication fluid such that said space is continuous with said dynamic pressure bearing via said lubrication fluid.

5. The dynamic pressure bearing apparatus as set forth in claim 1 characterized by a space being partitioned in the inner portion of said cover plate toward the bearing such that said space communicates with another space that is filled with said lubrication fluid in said dynamic pressure bearing apparatus.

6. A dynamic pressure bearing apparatus comprising:
   a bearing sleeve attached to a frame and having an upper opening and a lower opening;
   a rotary shaft inserted into the upper opening of the bearing sleeve, the rotary shaft being supported in a non-contacting manner by a dynamic pressure generated between the rotary shaft and the bearing sleeve when the rotary shaft rotates with respect to the bearing sleeve;
   a rotor attached to the rotary shaft so as to rotate integrally with the rotary shaft;
   a thin cover plate disposed over the lower opening to close the lower opening; and
   a product data label having desired information visibly formed thereon, the product data label being attached to the frame in a non-overlapping manner in an axial direction of the rotary shaft with an area of the thin cover plate that overlies the lower opening.

7. The dynamic pressure bearing apparatus according to claim 6 wherein the thin cover plate is generally circular in shape and the product data label is a ring-like member having an inner circumference which is larger than the circumference of the thin cover plate.

8. The dynamic pressure bearing apparatus according to claim 6 wherein the inner wall of the bearing sleeve facing the rotary shaft provides a radial bearing and at least one longitudinal edge of the bearing sleeve facing the rotor provides a thrust bearing.

9. A dynamic pressure bearing apparatus comprising:
   a bearing sleeve attached to the frame and having an upper opening and a lower opening;
   a rotary shaft inserted into the upper opening of the bearing sleeve, the rotary shaft being supported in a non-contacting manner by a dynamic pressure generated between the rotary shaft and the bearing sleeve when the rotary shaft rotates with respect to the bearing sleeve;
   a rotor attached to the rotary shaft so as to rotate integrally with the rotary shaft;
   a thin cover plate disposed over the lower opening to close the lower opening, an area covering the lower opening lying on a first plane; and
   a product data label having desired information visibly formed thereon, the product data label being attached to the frame and lying on the first plane.

10. The dynamic pressure bearing apparatus according to claim 9 wherein the thin cover plate is generally circular in shape and the product data label is a ring-like member having an inner circumference which is larger than the circumference of the thin cover plate.

11. The dynamic pressure bearing apparatus according to claim 9 wherein the inner wall of the bearing sleeve facing the rotary shaft provides a radial bearing and at least one longitudinal edge of the bearing sleeve facing the rotor provides a thrust bearing.

* * * * *